United States Patent
Kurisaki et al.

[11] Patent Number: 5,809,827
[45] Date of Patent: *Sep. 22, 1998

[54] FLOW RATE DETECTOR

[75] Inventors: Shogo Kurisaki; Takashi Takebayashi; Pinghou Ge; Tomonobu Endou, all of Ibaraki-ken, Japan

[73] Assignee: SMC Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 716,524

[22] Filed: Sep. 19, 1996

[30] Foreign Application Priority Data

Sep. 25, 1995 [JP] Japan .................................. 7-246519

[51] Int. Cl.$^6$ ...................................................... G01F 1/68
[52] U.S. Cl. ........................................................ 73/204.17
[58] Field of Search ........................... 73/204.15, 204.16, 73/204.17, 204.18, 204.19

[56] References Cited

U.S. PATENT DOCUMENTS

| | | | |
|---|---|---|---|
| 3,142,170 | 7/1964 | Calhoun | 73/204.16 |
| 3,335,606 | 8/1967 | Scarpa . | |
| 3,372,590 | 3/1968 | Sterling | 73/204.19 |
| 3,891,391 | 6/1975 | Boone | 73/204.19 |
| 3,975,951 | 8/1976 | Kohama et al. | 73/204.16 |
| 4,480,467 | 11/1984 | Harter et al. | 73/204.15 |
| 4,627,279 | 12/1986 | Ohta et al. | 73/204.15 |
| 4,860,583 | 8/1989 | Olson . | |
| 5,072,614 | 12/1991 | Hisanaga . | |
| 5,569,851 | 10/1996 | Ichimura et al. | 73/204.16 |

FOREIGN PATENT DOCUMENTS

| | | |
|---|---|---|
| 2456372 | 6/1975 | Germany . |
| 2447617 | 4/1976 | Germany . |
| 3331203 | 3/1985 | Germany . |
| 3811728 | 9/1989 | Germany . |

OTHER PUBLICATIONS

Omega catalog, The Flow and Level Handbook, vol. 29, copyright 1995, G–4, 8, M–3, 8, 30.

*Primary Examiner*—Ronald L. Biegel
*Assistant Examiner*—Harshad Patel
*Attorney, Agent, or Firm*—Oblon, Spivak, McClelland, Maier & Neustadt, P.C.

[57] ABSTRACT

A threshold value is stored in a CPU using setting switches. When a fluid is introduced into a flow passage, it lowers the temperature of a first thermistor heated by a regulated constant-current source, increasing the output voltage of the first thermistor. A second thermistor outputs a voltage corresponding to the temperature of the fluid. A differential amplifier outputs a differential voltage between the output voltages of the first and second thermistors, and the differential voltage is converted by an A/D converter into a digital voltage that is applied to a CPU. The CPU refers to a data table stored in a memory to determine a flow rate of the fluid based on the digital differential voltage. When the determined flow rate is greater than the threshold value, the CPU turns on transistors to energize loads as external devices. When the determined flow rate is smaller than the threshold value, the CPU turns off transistors to de-energize loads.

6 Claims, 5 Drawing Sheets

F I G. 1
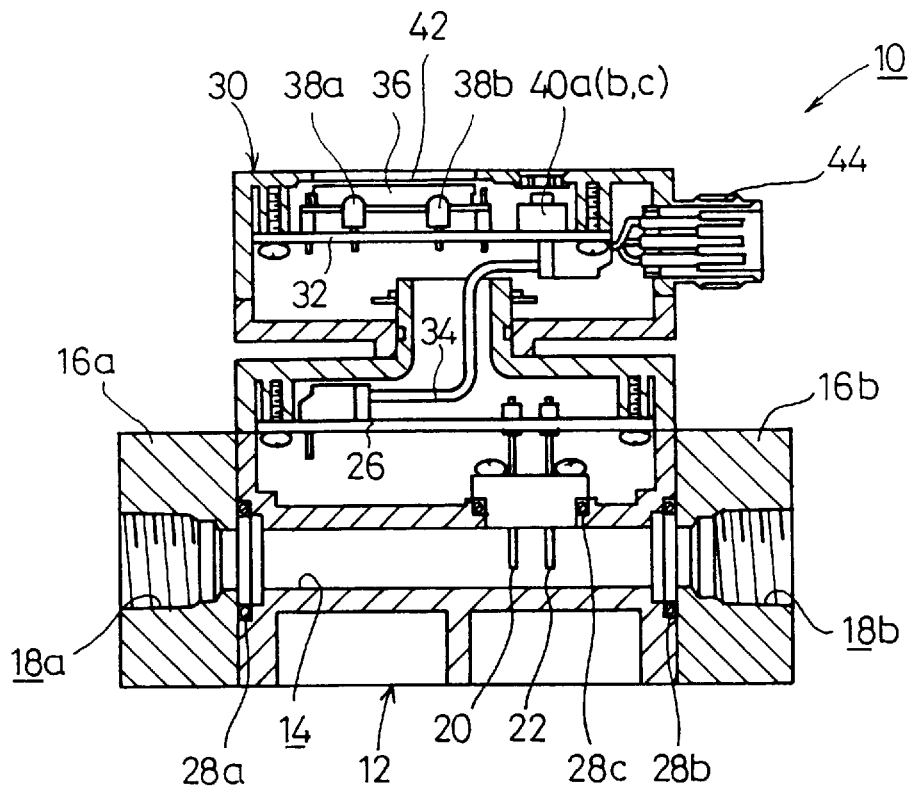
F I G. 2
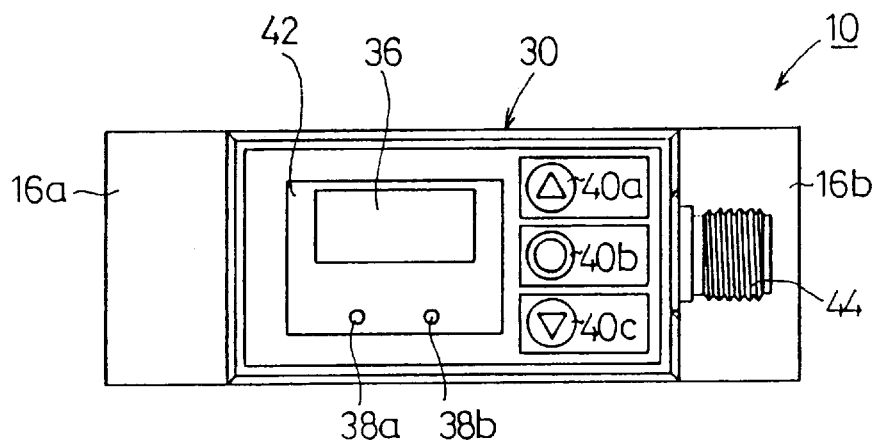

FLOW RATE DETECTOR

BACKGROUND OF THE INVENTION

1. Field of the Invention

The present invention relates to a flow rate detector for measuring the flow rate of a fluid which is introduced into a fluid passage.

2. Description of the Related Art

There has heretofore been known a flow rate detector comprising a temperature sensor and a heating means for heating the temperature sensor, the temperature sensor and the heating means being disposed in a flow passage for passage therethrough of a fluid whose flow rate is to be measured. When the fluid flows in the flow passage, the heated temperature sensor is deprived of heat by the fluid, and its temperature drops, resulting in a reduction in an output voltage from the temperature sensor. The speed at which the fluid flows in the flow passage is determined from the output voltage from the temperature sensor, and the flow rate of the fluid is calculated based on the measured speed of the fluid flow and the cross-sectional area of the flow passage.

The conventional flow rate detector, however, has no means for controlling an external device depending on the calculated flow rate, and has failed to automatically operate a desired external device when the flow rate of the fluid flowing through the flow passage is greater or smaller than a predetermined flow rate.

SUMMARY OF THE INVENTION

It is a general object of the present invention to provide a flow rate detector which is capable of controlling another device depending on the flow rate of a fluid which is detected thereby.

A primary object of the present invention is to provide a flow rate detector which measures the temperature of a temperature sensor that is disposed in a flow passage and heated, for thereby determining the flow rate of a fluid flowing through the flow passage and displaying the determined flow rate.

Another object of the present invention is to provide a flow rate detector which applies a differential signal between an output signal from a first temperature sensor that is disposed in a flow passage and heated by a heating means and an output signal from a second temperature sensor that is disposed in the flow passage and not heated, to a processing circuit which calculates a flow rate that has been compensated for a signal change due to the temperature of the fluid, displays the calculated flow rate on a display means, converts the result of a comparison between the calculated flow rate and a reference flow rate preset by a setting means into an electric signal, and outputs the electric signal to a signal output means for thereby controlling an external device based on the result of the comparison.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a longitudinal cross-sectional view of a flow rate detector according to a first embodiment of the present invention;

FIG. 2 is a plan view of the flow rate detector shown in FIG. 1;

DETAILED DESCRIPTION OF THE PREFERRED EMBODIMENTS

Figure 3:
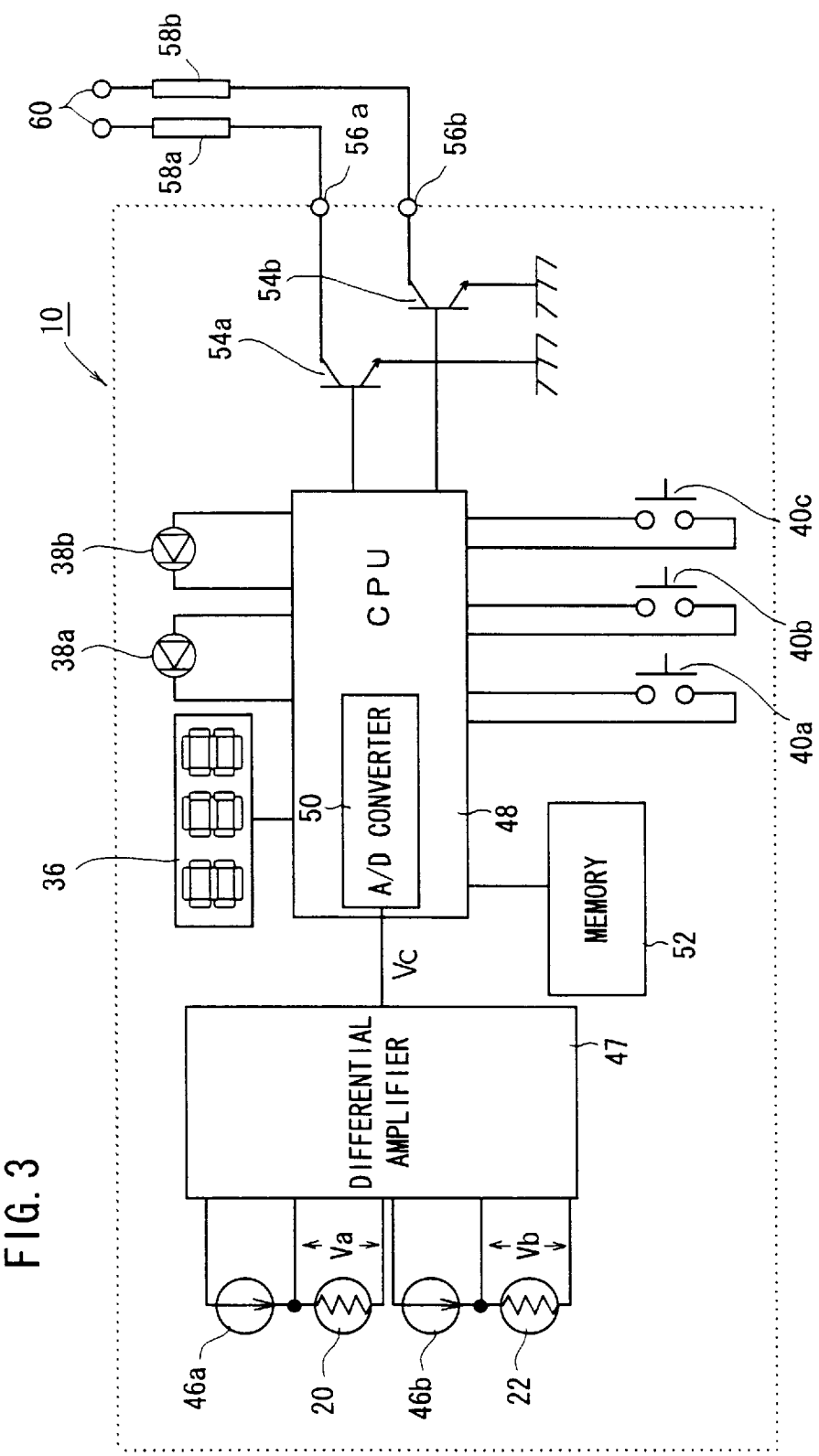
FIG. 3 is a block diagram of an electric circuit of the flow rate detector shown in FIG. 1.

As shown in FIG. 1, a flow rate detector 10 according to a first embodiment of the present invention includes an elongate casing 12 having a flow passage 14 of a substantially square cross-sectional shape defined longitudinally therein for passage of a fluid therethrough. The flow rate detector 10 also includes a pair of pipe connectors 16a, 16b mounted respectively on opposite ends of the casing 12 and having respective holes 18a, 18b defined therein in communication with the flow passage 14. The pipe connectors 16a, 16b have respective internally threaded surfaces which define the respective holes 18a, 18b, for connection to fluid inlet and outlet pipes, respectively.

A first thermistor 20 as a temperature sensor is disposed in the flow passage 14 and projects substantially centrally into the flow passage 14, and a second thermistor 22 as a temperature sensor is disposed in the flow passage 14 downstream from the first thermistor 20 in spaced relation thereto and projects substantially centrally into the flow passage 14. Each of the first and second thermistors 20, 22 is in the shape of a slender rod so as not to disturb or block the flow of a fluid that is introduced into the flow passage 14. The first and second thermistors 20, 22 are electrically connected to a circuit board 26 housed in the casing 12.

The pipe connectors 16a, 16b are connected to the respective opposite ends of the casing 12 through respective O-rings 28a, 28b for preventing the fluid from leaking out of the casing 12, and the first and second thermistors 20, 22 are mounted in the casing 12 through an O-ring 28c for preventing the fluid from leaking out along the first and second thermistors 20, 22.

A display unit 30 is fixed to an upper portion of the casing 12 and includes a circuit board 32 which is electrically connected to the circuit board 26 by leads 34. The circuit board 32 supports thereon a seven-segment LED (light-emitting diode) 36 capable of displaying a three-figure numeral, a pair of LEDs 38a, 38b, and setting switches 40a–40c serving as a setting means for establishing a reference flow rate. As shown in FIG. 2, the seven-segment LED 36 and the LEDs 38a, 38b are positioned so as to be visible from above the display unit 30 through a display window 42. The setting switches 40a–40c can be pressed from above the display unit 30. A connector 44 for outputting signals is electrically connected to the circuit board 32 and mechanically fixed to a wall of the display unit 30.

Figure 4:
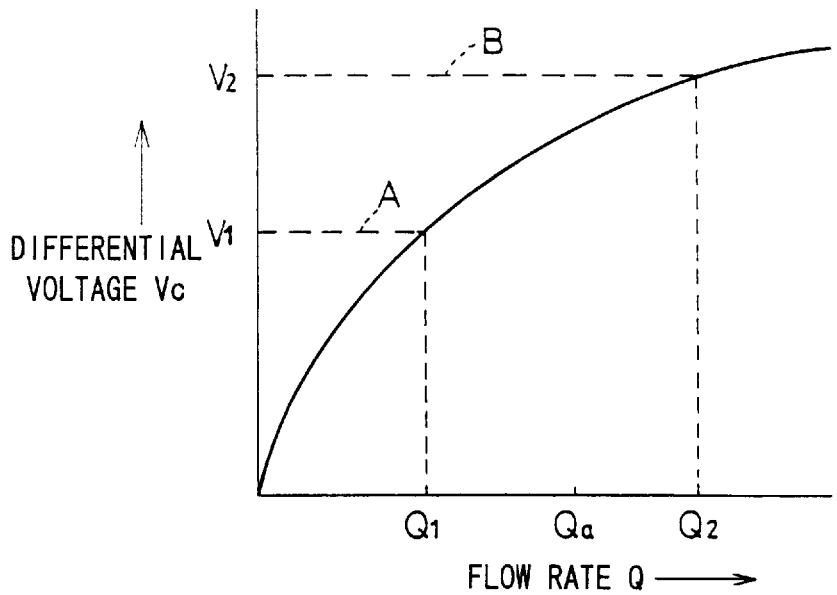
FIG. 4 is a graph showing the relationship between the flow rate of a fluid and the output voltage of a differential amplifier, indicated by a data table stored in a memory in the electric circuit shown in FIG. 3.

FIG. 3 shows in block form an electric circuit of the flow rate detector 10. As shown in FIG. 3, regulated constant-current sources 46a, 46b are connected in series with the first and second thermistors 20, 22, respectively. The first and second thermistors 20, 22 and the regulated constant-current sources 46a, 46b are connected to a differential amplifier 47 which serves as a compensation circuit. Since output voltages from the first and second thermistors 20, 22 suffer error due to variations of the individual devices, the differential amplifier 47 has an adjusting device such as a rheostat or the like (not shown) for absorbing such an error. The differential amplifier 47 outputs a differential voltage Vc between voltages Va, Vb across the respective first and second thermistors 20, 22, and applies the differential voltage Vc to an A/D (analog-to-digital) converter 50 in a CPU (central processing unit) 48. Therefore, the differential voltage Vc is converted by the A/D converter 50 from an analog value into a digital value before being processed by the CPU 48. To the CPU 48, there is connected a memory 52 which stores a data table (see FIG. 4) representing the relationship between the differential voltage Vc that has experimentally been measured and the flow rate Q of a fluid in the flow passage 14. The seven-segment LED 36, the LEDs 38a, 38b, and the setting switches 40a–40c are connected to the CPU 48. The CPU 48 applies output signals to the bases of transistors 54a, 54b whose collectors are connected to respective output terminals 56a, 56b of the connector 44. The regulated constant-current sources 46a, 46b, the differential amplifier 47, the CPU 48, the memory 52, and the transistors 54a, 54b are mounted on either the circuit board 26 or the circuit board 32. When the flow rate detector 10 is used to control loads 58a, 58b as external devices, respective terminals of the loads 58a, 58b are connected to the output terminals 56a, 56b, respectively, and other terminals of the loads 58a, 58b are connected to a power supply 60.

The number of the loads 58a, 58b as external devices varies depending on the number of the transistors 54a, 54b and the number of the output terminals 56a, 56b. In the illustrated first embodiment, since there are two transistors 54a, 54b and two output terminals 56a, 56b, two loads 58a, 58b as external devices may be connected to the flow rate detector 10.

Operation of the flow rate detector 10 will be described below.

First, an offset between and spans of output voltages from the first and second thermistors 20, 22 are adjusted by the adjusting device in the differential amplifier 47, thereby absorbing any output voltage error due to variations of the first and second thermistors 20, 22.

Then, the regulated constant-current sources 46a, 46b are energized to supply respective currents to the first and second thermistors 20, 22. At this time, the current supplied from the regulated constant-current source 46a to the first thermistor 20 is set to a larger value to heat the first thermistor 20 to a temperature of about 150° C. Therefore, the regulated constant-current source 46a serves as a heating means for heating the first thermistor 20. If the second thermistor 22, which is used to measure the temperature of the fluid in the flow passage 14, were heated, then it would not be able to accurately measure the temperature of the fluid. Therefore, the current supplied from the regulated constant-current source 46b to the second thermistor 22 is set to a smaller value to minimize the heating of the second thermistor 22.

Thereafter, two threshold values (reference flow rate values) Qa, Qb corresponding to the two external devices (loads 58a, 58b) are stored in the CPU 48 using the setting switches 40a–40c.

After the above preparatory stage, a fluid such as air is introduced from the fluid inlet pipe into the flow rate detector 10. The introduced fluid flows successively through the hole 18a, the flow passage 14, and the hole 18b into the fluid outlet pipe. The fluid flowing in the flow passage 14 contacts the first thermistor 20, deprives the first thermistor 20 of heat, thus lowering the temperature of the first thermistor 20. Therefore, when the flow rate Q of the fluid flowing in the flow passage 14 increases, the resistance of the first thermistor 20 increases, and the voltage Va across the first thermistor 20 also increases. If the fluid has a lower temperature, since it deprives the first thermistor 20 of more heat, the voltage Va across the first thermistor 20 further increases.

The fluid flowing in the flow passage 14 also contacts the second thermistor 22. However, because the second thermistor 22 is not heated, its temperature is the same as the temperature of the fluid. Therefore, the voltage Vb across the second thermistor 22 is constant regardless of the flow rate Q of the fluid. The voltage Vb across the second thermistor 22 is lower as the temperature of the fluid is higher, and higher as the temperature of the fluid is lower. As a result, the voltage Vb across the second thermistor 22 is representative of a voltage change depending on the temperature of the fluid. The above action of the first and second thermistors 20, 22 can readily be understood because both thermistors have a negative temperature coefficient.

The voltages Va, Vb across the first and second thermistors 20, 22 are applied to the differential amplifier 47, which outputs a differential voltage Vc between the voltages Va, Vb. The differential voltage Vc indicates only an output voltage change due to the speed of the fluid flow because the voltage Vb across the second thermistor 22, which represents a voltage change due to the fluid temperature, has been deduced from the voltage Va across the first thermistor 20. The A/D converter 50 converts the differential voltage Vc from an analog value into a digital value. The CPU 48 then refers to the data table stored in the memory 52 to determine a flow rate Q based on the digital differential voltage Vc (see FIG. 4). For example, when the differential voltage Vc outputted from the differential amplifier 47 has a value V1, then the flow rate Q is determined as having a value Q1. The CPU 48 displays the flow rate Q thus determined on the seven-segment LED 36.

Thereafter, the CPU 48 compares the flow rate Q with the threshold values Qa, Qb, displays the results of the comparison on the LEDs 38a, 38b, and outputs them through the transistors 54a, 54b to the output terminals 56a, 56b. With respect to the threshold value Qa and the output terminal 56a, for example, if the flow rate Q is of a value Q1 which is smaller than the threshold value Qa as indicated by the broken line A in FIG. 4, then the CPU 48 turns off the LED 38a and also turns off the transistor 54a. Since no current flows through the load 58a at this time, the load 58a is de-energized. If the flow rate Q is of a value Q2 which is greater than the threshold value Qa as indicated by the broken line B in FIG. 4, then the CPU 48 turns on the LED 38a and also turns on the transistor 54a. A current flows from the power supply 60 through the load 58a and the transistor 54a, energizing the load 58a.

With respect to the threshold value Qb and the output terminal 56b, the load 58b connected to the output terminal 56b is controlled in the same manner as described above based on the result of a comparison between the flow rate Q and the threshold value Qb.

The flow rate is measured per given time, e.g., every second. Therefore, the results of the comparison between the flow rate Q and the threshold values Qa, Qb are outputted to the LEDs 38a, 38b and the output terminals 56a, 56b every second.

Each of the loads 58a, 58b (external devices) may comprise a flow control valve, for example, for controlling the flow rate of the fluid. When the flow rate Q becomes greater than the threshold value Qa or Qb, the flow control valve is closed to reduce the flow rate Q. When the flow rate Q becomes smaller than the threshold value Qa or Qb, the flow control valve is opened to increase the flow rate Q. Such a flow control valve is used, for example, in an IC (integrated circuit) fabrication process in which it controls the flow rate of a nitrogen gas or compressed air ejected for wiring bonding, or in a food manufacturing process for manufacturing cakes or the like in which it controls the flow rate of a nitrogen gas introduced into food containers.

A lamp or a buzzer may be connected to each of the loads 58a, 58b, and when the flow rate Q of the fluid supplied to the loads 58a, 58b used in combination with the flow rate detector 10 becomes greater or smaller than the threshold value Qa or Qb, the lamp or the buzzer may be turned on to indicate an abnormal condition of the loads 58a, 58b.

In the above first embodiment, as described above, a flow rate is measured by compensating for a change in the output voltage of the first thermistor 20 heated by the heating means with the output voltage of the second thermistor 22 which is not heated, with the differential amplifier 47, and compared with predetermined flow rate data to turn on or off the loads 58a, 58b connected to the output terminals 56a, 56b. Therefore, it is possible to control an external device depending on the flow rate of the fluid flowing through the flow passage 14.

Figure 5:
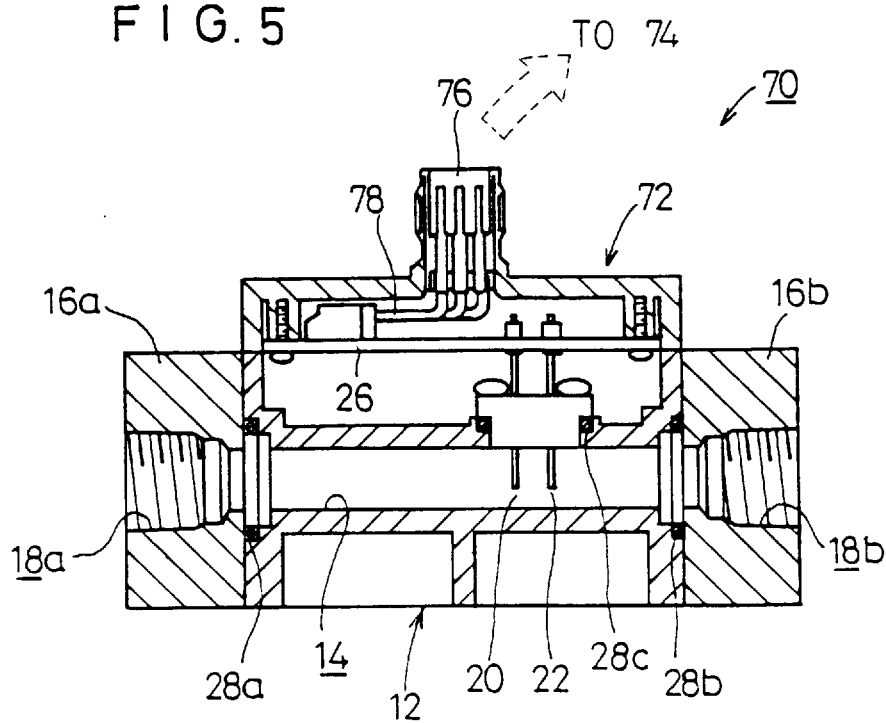
FIG. 5 is a longitudinal cross-sectional view of a flow rate detector according to a second embodiment of the present invention.
Figure 6:
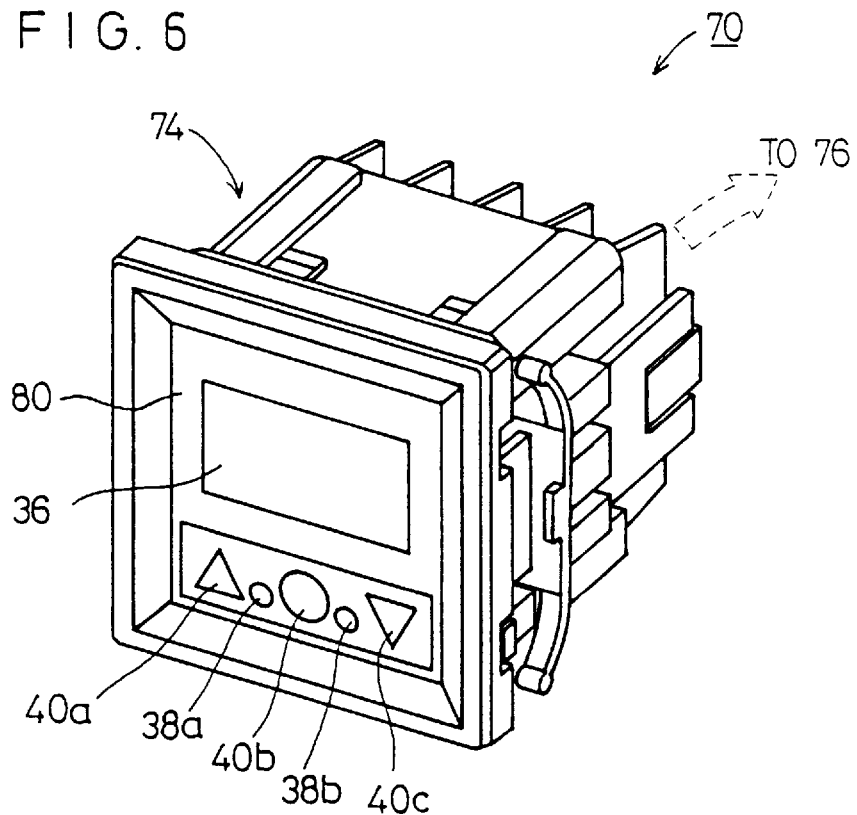
FIG. 6 is a perspective view of a display unit of the flow rate detector according to the second embodiment.
Figure 7:
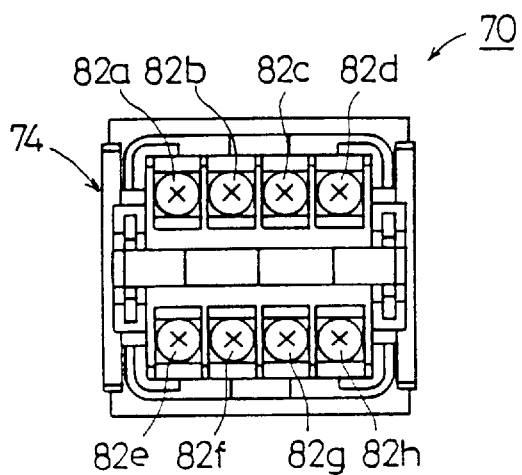
FIG. 7 is a rear elevational view of the display unit shown in FIG. 6.

FIGS. 5 through 7 show a flow rate detector 70 according to a second embodiment of the present invention. Only those details of the flow rate detector 70 which are different from those of the flow rate detector 10 according to the first embodiment will be described below. Those parts of the flow rate detector 70 which are identical to those of the flow rate detector 10 according to the first embodiment will not be described in detail below.

As shown in FIGS. 5 through 7, the flow rate detector 70 comprises a casing 72 and a display unit 74 separate from the casing 72. A circuit board 26 housed in the casing 72 is connected by leads 78 to a connector 76 mounted on an upper panel of the casing 72, and the connector 76 is connected to the display unit 74 by leads (not shown).

As shown in FIG. 6, the display unit 74 has a display panel 80 which supports a seven-segment LED 36, LEDs 28a, 28b, and setting switches 40a–40c. As shown in FIG. 7, terminals 82a–82h are mounted on a rear panel of the display unit 74, and the loads 58a, 58b shown in FIG. 3 and the connector 76 shown in FIG. 5 are connected to some of the terminals 82a–82h.

Since the display unit 74 can be installed in a position separate from the casing 72, it is easy to position the display unit 74 for easy visual recognition. For example, even if the casing 72 is placed in a location that cannot easily be accessible, the display unit 74 may be positioned remotely from the casing 72 for easy visual observation.

Figure 8:
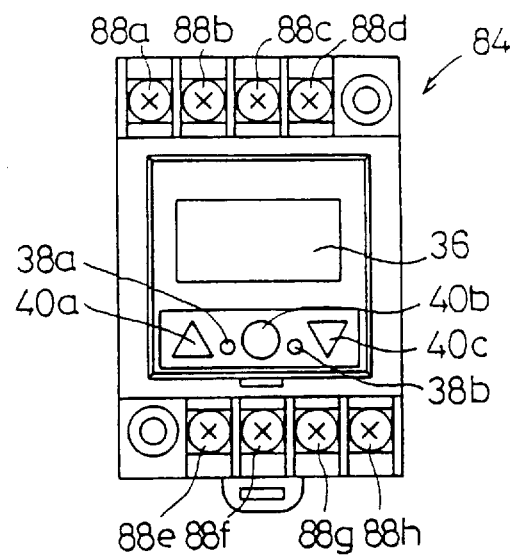
FIG. 8 is a plan view of a display unit of a flow rate detector according to a third embodiment of the present invention.
Figure 9:
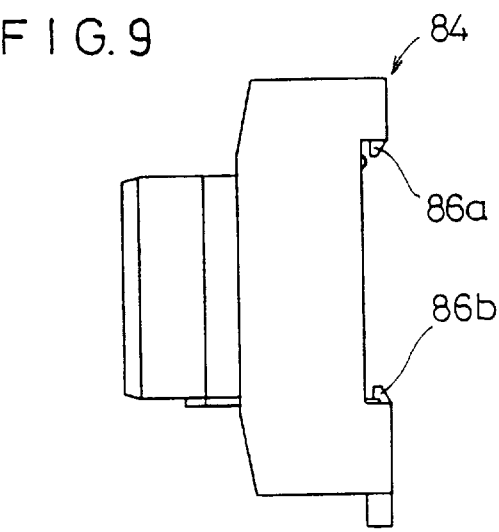
FIG. 9 is a side elevational view of the display unit shown in FIG. 8.

According to a third embodiment shown in FIGS. 8 and 9, a display unit 84 has a pair of engaging teeth 86a, 86b on its rear panel for mounting the display unit 84 on an elongate rail. The display unit 84 has terminals 88a–88h on a front panel thereof.

In the first and second embodiments, the loads 58a, 58b are energized when the flow rate Q of the fluid is greater than the threshold values Qa, Qb. However, the loads 58a, 58b may be energized when the flow rate Q of the fluid is smaller than the threshold values Qa, Qb.

In the first and second embodiments, a flow rate is measured per given time. However, flow rates determined per given time may be added into an integrated flow rate, the integrated flow rate may be displayed on the seven-segment LED 36, and given integrated flow rates may be established as threshold values. In this case, a measured integrated flow rate is compared with threshold values, and the results of the comparison are outputted to the output terminals 56a, 56b. When the fluid flows at rates established as the threshold values, the loads 58a, 58b connected to the output terminals 56a, 56b are energized or de-energized.

The number of the threshold values Qa, Qb may be varied depending on the number of desired output signals, and the number of the output terminals 56a, 56b may also be varied.

Although certain preferred embodiments of the present invention has been shown and described in detail, it should be understood that various changes and modifications may be made therein without departing from the scope of the appended claims.

What is claimed is:

1. A flow rate detector comprising:

a flow passage for passage of a fluid therethrough;

a first temperature sensor, comprising a first thermistor, disposed in said flow passage;

heating means for heating said first temperature sensor;

a second temperature sensor, comprising a second thermistor, disposed in said flow passage downstream of said first temperature sensor;

regulated constant-current sources connected respectively to the first and second thermistors, said regulated constant-current source connected to said first thermistor comprising said heating means for supplying a current to said first temperature sensor to heat said first temperature sensor;

a compensating circuit for compensating for a first output signal from said first temperature sensor with a second output signal from said second temperature sensor; and outputting a compensated signal;

display means for displaying a flow rate;

setting means for establishing a reference flow rate;

signal output means for outputting a third output signal;

a processing circuit for calculating said flow rate of the fluid flowing in said flow passage from said compensated signal from said compensating circuit, displaying the calculated flow rate on said display means, comparing the calculated flow rate with the reference flow rate established by said setting means, and outputting said third output signal, wherein said third output signal being indicative of said comparison of said calculated flow rate with said reference flow rate; and a pair of transistors connected between said processing circuit and said signal output means, whereby said transistors are selectively turned on and off by said processing circuit to selectively energize and de-energize external devices connected to said signal output means.

2. A flow rate detector according to claim 1, wherein said processing circuit has a data table representative of the relationship between an output voltage of said compensating circuit and the flow rate of the fluid flowing through said flow passage, and comprises means for determining the flow rate by referring to said data table in response to the compensated signal outputted from said compensating circuit.

3. A flow rate detector according to claim 2, wherein each of said first and second temperature sensors is of a rod shape and projects substantially centrally into said flow passage, said second temperature sensor being spaced downstream from said first temperature sensor.

4. A flow rate detector according to claim 1, wherein each of said first and second temperature sensors is of a rod shape and projects substantially centrally into said flow passage, said second temperature sensor being spaced downstream from said first temperature sensor.

5. A flow rate detector according to claim 1, wherein said compensating circuit comprises a differential amplifier.

6. A flow rate detector according to claim 1, further comprising regulated constant-current sources connected respectively to the first and second thermistors, said regulated constant-current source connected to said first thermistor comprising said heating means for supplying a current to said first temperature sensor to heat the first temperature sensor.

* * * * *